UNITED STATES PATENT OFFICE.

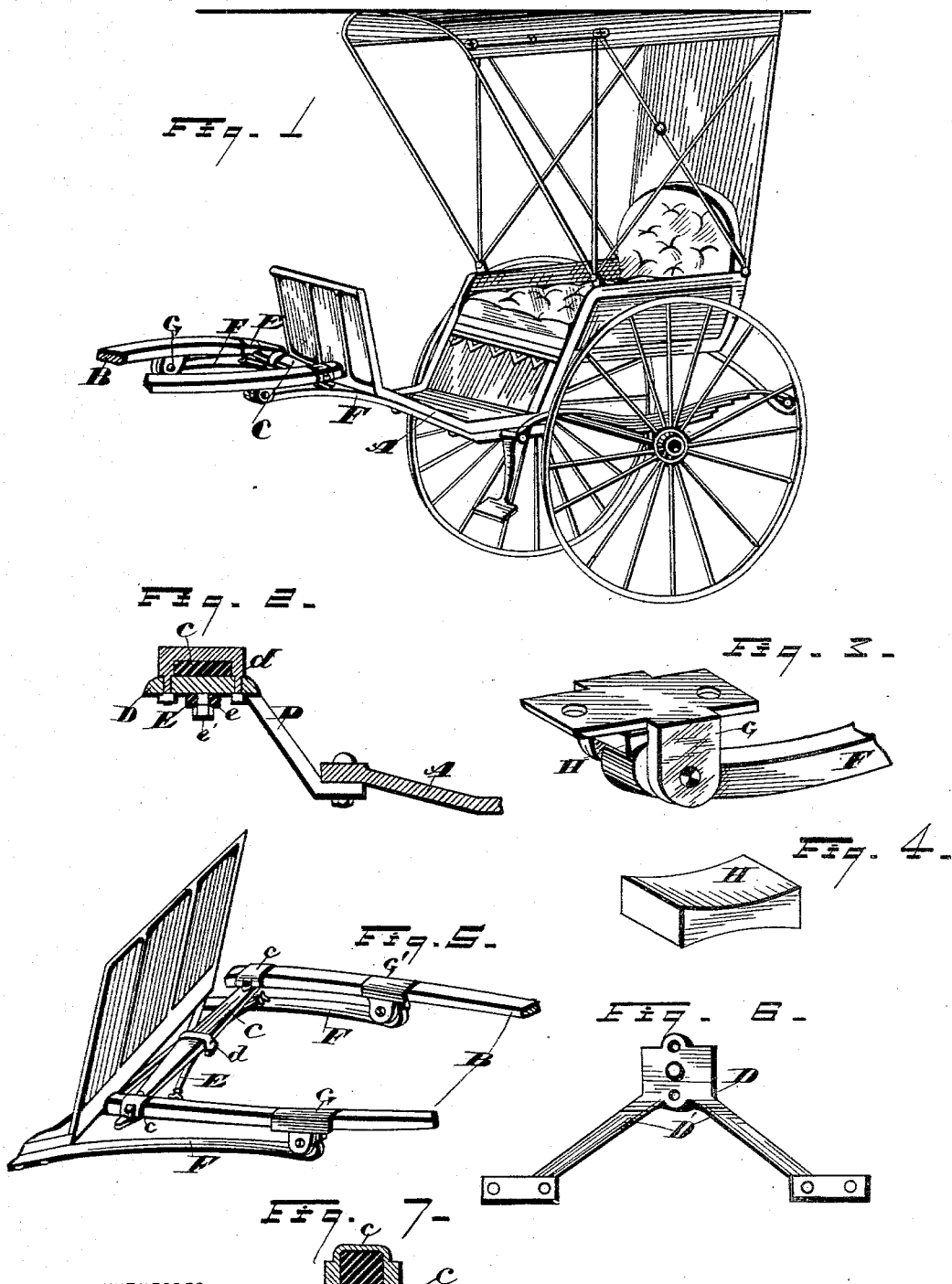

WILLIAM CLUCAS, OF CLEVELAND, OHIO.

TWO-WHEELED VEHICLE.

SPECIFICATION forming part of Letters Patent No. 304,075, dated August 26, 1884.

Application filed April 8, 1884. (No model.)

*To all whom it may concern:*

Be it known that I, WILLIAM CLUCAS, of Cleveland, in the county of Cuyahoga and State of Ohio, have invented certain new and useful Improvements in Shaft Attachments for Two-Wheeled Vehicles; and I do hereby declare the following to be a full, clear, and exact description of the invention, such as will enable others skilled in the art to which it pertains to make and use the same.

My invention relates to improvements in shaft attachments for two-wheeled vehicles, the object being to provide a spring forming a cross-bar and support for the rear end of the shaft, and rigidly supported in the center from the body of the vehicle, and shaft-stays rigidly secured to the vehicle and hinged or pivoted to the shafts some distance forward of the said supporting-spring, by means of which the parts are rendered flexible, to the end that the vehicle is not shaken by the motion of the horse in traveling.

With these objects in view my invention consists in certain features of construction and in combination of parts hereinafter described, and pointed out in the claim.

In the accompanying drawings, Figure 1 is a view in perspective of a two-wheeled vehicle with my improvements attached. Fig. 2 is an enlarged transverse vertical section of the spring, whiffletree, and support, and in elevation the braces that are attached to the body of the vehicle. Fig. 3 is an enlarged view in perspective of one of the shaft-stays and attachments. Fig. 4 is a view in perspective of a piece of rubber, forming a part of the device shown in Fig. 3. Fig. 5 is an enlarged view in perspective of a portion of the shaft and attachments and the front portion of the vehicle. Fig. 6 is an enlarged view in perspective of the plate and braces that support the spring of the shafts. Fig. 7 is a vertical section showing the manner of attaching the spring to the shafts.

A represents the body of the vehicle; B, the shafts, and C the spring that forms a cross-bar and support for the rear end of the shafts. The spring is provided near the ends with holes, and secured to the shafts by ordinary clips, c, as shown in Fig. 7. The spring at the center rests flatwise on the plate D, and is secured by the clip d. The plate D is provided with the two diverging braces D', that are bent downward and rearward and rigidly attached to the body of the vehicle, as shown in Fig. 3.

E is the whiffletree, supported under the plate D by the pendent lug e, provided with the nut e', for which a screw-bolt may be substituted, if preferred.

F are shaft-stays rigidly attached to the body of the vehicle, and hinged or pivotally attached to the shafts some distance forward of the part C.

A preferable manner of attaching the stays to the shafts is shown in Fig. 3, the plate G being bolted to the respective shaft on the under side.

If preferred, the plate G may be secured by a clip, as shown at G, Fig. 5. A piece of rubber, H, is inserted in the usual manner, to prevent the parts from rattling.

By means of the hinged or pivotal attachment between the shaft and shaft-stays and of the elasticity of the spring C, such a flexibility of the parts is had that the shafts, while furnishing adequate support to the vehicle, do not convey to it the motion caused by the horse in traveling, and the vehicle is therefore relieved of the constant shaking usually had in two-wheeled vehicles, and so tiresome alike to the rider and horse.

What I claim is—

In a two-wheeled vehicle, the combination, with a body and shaft-stays secured thereto, of shafts pivotally secured to the stays, a spring connecting the rear end of the shafts, the bracket D, secured to the under side of the vehicle, a clip securing the spring to the bracket, and a whiffletree secured to the bracket, all of the above parts operating as set forth.

In testimony whereof I sign this specification, in the presence of two witnesses, this 3d day of April, 1884.

WILLIAM CLUCAS.

Witnesses:
ALBERT E. LYNCH,
CHAS. H. DORER.